US012605912B2

(12) United States Patent
Pridie

(10) Patent No.: US 12,605,912 B2
(45) Date of Patent: Apr. 21, 2026

(54) DEVICE FOR MANUFACTURING A STIFFENED PANEL MAKING IT POSSIBLE TO CONTROL THE GEOMETRY OF SAID STIFFENED PANEL, AND METHOD FOR MANUFACTURING A STIFFENED PANEL USING SAID DEVICE

(71) Applicant: Airbus Operations (S.A.S.), Toulouse (FR)

(72) Inventor: Jago Pridie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 254 days.

(21) Appl. No.: 18/655,963

(22) Filed: May 6, 2024

(65) Prior Publication Data

US 2024/0286370 A1     Aug. 29, 2024

Related U.S. Application Data

(62) Division of application No. 18/064,664, filed on Dec. 12, 2022, now Pat. No. 12,005,665.

(30) Foreign Application Priority Data

Dec. 14, 2021     (FR) ...................................... 2113420

(51) Int. Cl.
| | |
|---|---|
| *B29D 99/00* | (2010.01) |
| *B29C 51/26* | (2006.01) |
| *B29C 70/30* | (2006.01) |
| *B29C 70/44* | (2006.01) |
| *B29C 70/46* | (2006.01) |

(Continued)

(52) U.S. Cl.
CPC ........ *B29D 99/0014* (2013.01); *B29C 51/261* (2013.01); *B29C 70/30* (2013.01); *B29C 70/446* (2013.01); *B29C 70/46* (2013.01); *B29C 70/543* (2013.01); *B29K 2105/12* (2013.01); *B29K 2105/253* (2013.01)

(58) Field of Classification Search
CPC ................................................. B29C 70/30–56
See application file for complete search history.

(56) References Cited

U.S. PATENT DOCUMENTS

| | | | |
|---|---|---|---|
| 5,650,215 A | 7/1997 | Mazurek |
| 2007/0175171 A1 | 8/2007 | Delgado |

(Continued)

*Primary Examiner* — Susan D Leong
*Assistant Examiner* — Vipul Malik
(74) *Attorney, Agent, or Firm* — KDW Firm PLLC

(57) ABSTRACT

A device for manufacturing a stiffened panel with reinforcements which each have a final thickness and a final height. The manufacturing device includes tools configured to each support a preform of fibers having a U-shaped or C-shaped cross section with a base and two wings. Each tool comprises, at at least one of its first and second lateral faces, a set-back portion which, when two tools are juxtaposed, delimits a recess configured to form a reinforcement during a consolidation or polymerization step. The tools are dimensioned such that each recess has a width, at the consolidation or polymerization temperature, that is substantially equal to the thickness of the reinforcements. This solution makes it possible to more effectively control the geometry of the stiffened panel by avoiding the formation of beads. A method for manufacturing a stiffened panel using the device is also disclosed.

14 Claims, 8 Drawing Sheets

(51)  Int. Cl.
   B29C 70/54       (2006.01)
   B29K 105/00      (2006.01)
   B29K 105/12      (2006.01)

(56)                    References Cited

U.S. PATENT DOCUMENTS

| 2011/0308714 | A1 | 12/2011 | Sander |
| 2014/0290840 | A1 | 10/2014 | Bardenhagen |
| 2016/0158973 | A1 | 6/2016 | Wallen |
| 2017/0297279 | A1 | 10/2017 | Fiegl |
| 2018/0079154 | A1* | 3/2018 | Moricet .................. B29C 70/54 |

* cited by examiner

PRIOR ART

PRIOR ART

PRIOR ART

Fig. 7

DEVICE FOR MANUFACTURING A STIFFENED PANEL MAKING IT POSSIBLE TO CONTROL THE GEOMETRY OF SAID STIFFENED PANEL, AND METHOD FOR MANUFACTURING A STIFFENED PANEL USING SAID DEVICE

TECHNICAL FIELD

The subject matter herein relates to a device for manufacturing a stiffened panel making it possible to control the geometry of the stiffened panel, and to a method for manufacturing a stiffened panel using the device.

BACKGROUND

According to one embodiment, a stiffened panel 10 comprises a panel 12, in the form of a plate, and reinforcements 14 which are attached to a face of the panel 12 and which are parallel to one another and substantially perpendicular to the panel 12.

According to one embodiment described in document FR2942165 and visible in FIGS. 2 and 3, the reinforcements are obtained from preforms of fibers 16 each having a U-shaped cross section, with a base 18 and two wings 20.1, 20.2. According to a manufacturing method referred to as IML (Inner Mold Line), each preform of fibers 16 is positioned on a tool 22, then the different tools 22 are arranged on a support 24, the bases 18 of the different preforms of fibers 16 being oriented upwards, the wings 20.1, 20.2 of two adjacent preforms of fibers 16 being pressed against one another. Then, at least one layer of fibers 26 is attached to the bases 18 of the preforms of fibers 16. The preforms of fibers 16 and the layer of fibers 26 are then consolidated simultaneously or co-cured, with a supply of resin if the fibers of the preforms of fibers 16 and of the layer of fibers 26 are dry. At the end of this consolidation or polymerization step, a stiffened panel 10 is obtained, the layer of fibers 26 and the bases 18 of the preforms of fibers 16 forming the panel 12 of the stiffened panel 10, the wings 20.1, 20.2 of the preforms of fibers 16 forming the reinforcements 14 of the stiffened panel 10.

According to one configuration visible in FIG. 3, each tool 22 comprises an upper face 28.1 on which the base 18 of a preform of fibers 16 is placed, a lower face 28.2 substantially parallel to the upper face 28.1 and configured to be placed on the support 24 and first and second lateral faces 30, 32 which connect the upper and lower faces 28.1, 28.2. At least one of the lateral faces 30, 32 comprises a first flat facet 32.1 which is adjacent and substantially perpendicular to the upper face 28.1, a second flat facet 32.2 which is adjacent and substantially perpendicular to the lower face 28.2 and a set-back portion 32.3 which connects the first and second facets 32.1, 32.2 and which is substantially parallel to the upper face 28.1. Thus, when two tools 22 are juxtaposed, they delimit a recess 34 for the wings 20.1, 20.2 of the preforms of fibers 16 which are positioned on the two tools 22.

In contrast to the preforms of fibers 16 which are not excessively affected by expansion phenomena, the tools 22 have dimensions which vary as a function of temperature. As illustrated in FIG. 3, in order to take account of these differences in dimensional variations, each preform of fibers 16 has, at ambient temperature, an excess length L with respect to the tool 22 receiving it so that the first and second faces 28.1, 28.2 of the tool 22 are in contact with the wings 20.1, 20.2 of the preform of fibers 16 at the consolidation or polymerization temperature, of the order of 180° C.

In order to take account of the dimensional variation of the tools 22, the tools 22 are positioned slightly spaced apart on the support 24 at ambient temperature such that they are in contact with one another at the consolidation or polymerization temperature.

When placing preforms of fibers 16 on their tools 22, the excess lengths may generate beads 36.

During the consolidation or polymerization step, the wings 20.1, 20.2 are compacted in the recesses 34 due to the expansion of the tools 22. For each reinforcement 14, since the ends of the wings 20.1, 20.2 are in contact with the set-back portion 32.3, this compacting accentuates a bead 36 that is already present or causes the formation of a bead 36 on that face of the preforms of fibers 16 on which the layer of fibers 26 has to be deposited. The addition of this layer of fibers 26 accentuates the protruding shape of the beads 36.

The presence of these beads 36 proves to be problematic when laying the layer of fibers 26 because the laying heads may collide with the beads 36.

The use of a caul plate 38 during the consolidation or polymerization step does not make it possible to flatten these beads 36, and so the final part has beads, this possibly not being acceptable for certain parts to be produced.

The disclosure herein seeks to remedy all or some of the drawbacks of the prior art.

SUMMARY

To that end, one subject of the disclosure herein is a device for manufacturing a stiffened panel comprising a panel and reinforcements which each have a final thickness and a final height. This manufacturing device comprises at least one support having a bearing surface, and tools which are configured to each support a preform of fibers having a U-shaped or C-shaped cross section with a base and two wings, each tool having a first face configured to receive the base of a preform of fibers, a second face configured to be positioned against the bearing surface of the support and first and second lateral faces which connect the first and second faces and are configured to receive the wings of a preform of fibers; at least one of the first and second lateral faces having a set-back portion which, when two tools are juxtaposed, delimits a recess opening out at the first faces and configured to form a reinforcement during a consolidation or polymerization step. In operation, each tool is subjected to a first temperature and then to a second, consolidation or polymerization temperature greater than the first temperature during a consolidation or polymerization step.

According to the disclosure herein, the tools are dimensioned such that each recess has a width, at the second, consolidation or polymerization temperature, that is substantially equal to the thickness of the reinforcement to be formed in the recess.

This solution makes it possible to more effectively control the geometry of the stiffened panel by avoiding the formation of beads.

According to another feature, each tool comprises, at each set-back portion, a coating which is able to expand as a function of temperature.

According to another feature, each tool comprises a first dimension, measured in a transverse plane, separating the first face and the set-back portion, the first dimension having a first value at the first temperature and a second value at the second, consolidation or polymerization temperature. In addition, the expandable coating and the first dimension of the tool are determined in such a way that wings of preforms of fibers that are positioned in line with the set-back portion are in contact with the expandable coating at the second, consolidation or polymerization temperature during a consolidation or polymerization step.

According to another feature, the expandable coating is configured to no longer expand when it is in contact with the wings during a consolidation or polymerization step.

According to another feature, the expandable coating is non-reversible.

According to another feature, the expandable coating comprises a repositionable adhesive layer for connecting it to the tool.

According to another feature, each tool comprises, at the set-back portion, a second dimension measured in a transverse plane and corresponding to the width of the set-back portion, the second dimension having a third value at the first temperature and a fourth value at the second, consolidation or polymerization temperature. In addition, the third value of the second dimension is greater than the final thickness of the reinforcement to be formed in line with the set-back portion.

According to another feature, the second dimension is determined in such a way that the fourth value is substantially equal to the final thickness of the reinforcement to be formed in line with the set-back portion.

Another subject of the disclosure herein is a method for manufacturing a stiffened panel, wherein the manufacturing method comprises:

a step of placing preforms of fibers on tools which are each provided with an expandable coating at each set-back portion, a step of positioning the tools provided with preforms of fibers on the support, a step of laying a layer of fibers on the bases of the preforms of fibers, a step of placing a consolidation or polymerization covering on the layer of fibers, a step of consolidation or polymerization, a step of demolding, a step of applying new non-expanded expandable coatings to each of the set-back portions.

BRIEF DESCRIPTION OF THE DRAWINGS

Other features and advantages will become apparent from the following description of the disclosure herein, which description is given solely by way of example, with reference to the appended drawings, in which.

4

Figure 1:
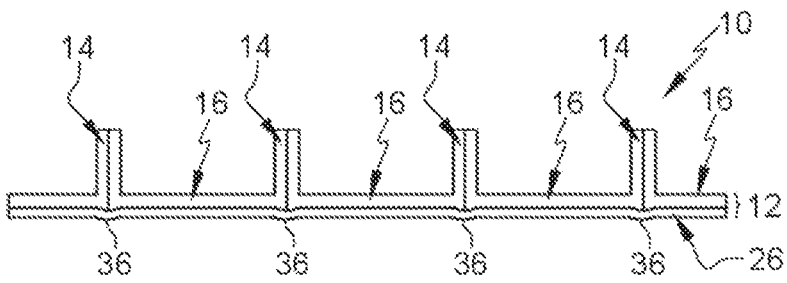
FIG. 1 is a schematic cross section of a stiffened panel, illustrating an embodiment of the prior art.
Figure 2:
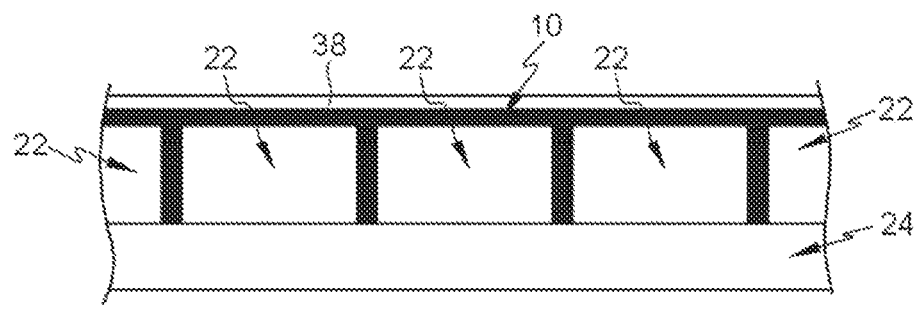
FIG. 2 is a schematic cross section of a device for manufacturing a stiffened panel, illustrating an embodiment of the prior art.
Figure 3:
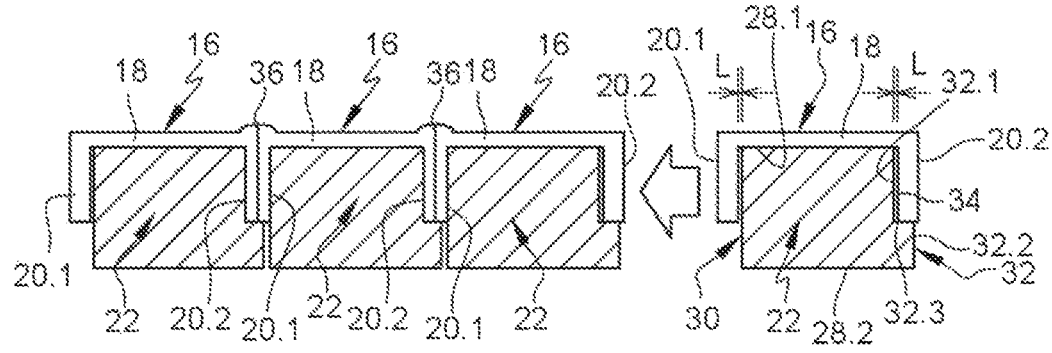
FIG. 3 is a schematic cross section of tools of a device for manufacturing a stiffened panel, illustrating an embodiment of the prior art.
Figure 4:
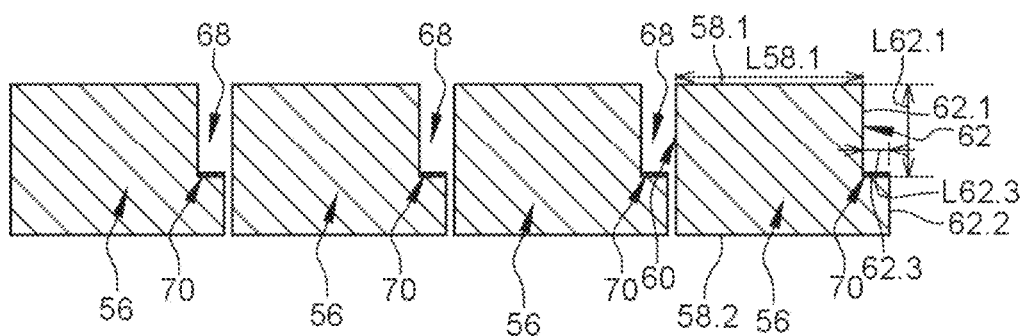
FIG. 4 is a schematic cross section of tools of a device for manufacturing a stiffened panel, illustrating one embodiment of the disclosure herein.
Figure 7:
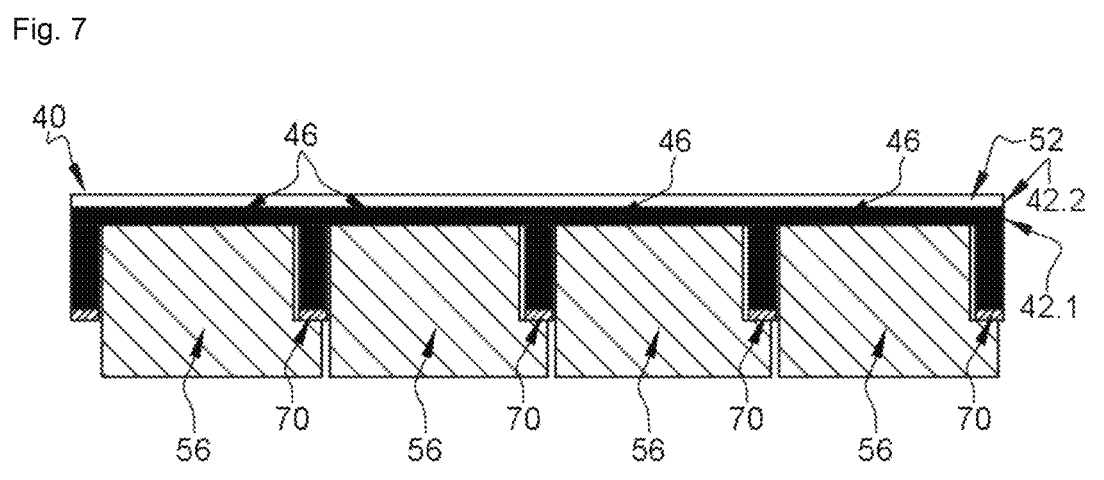
Figure 8:
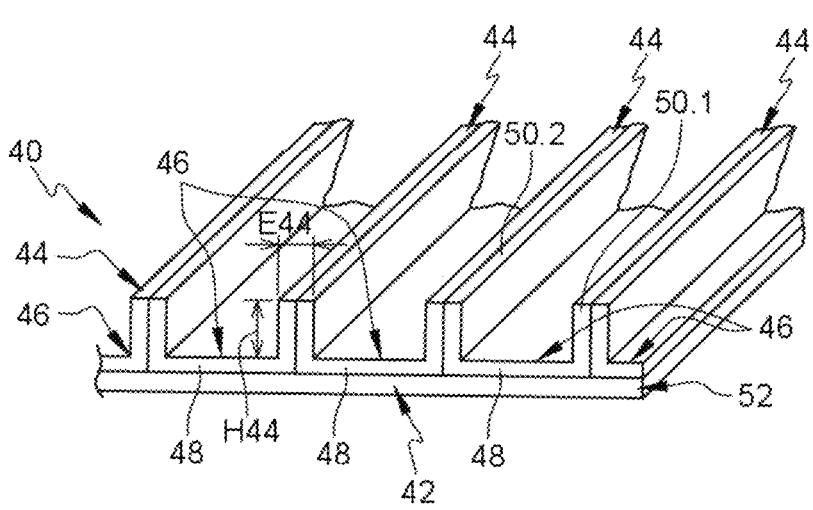

FIG. 7 is a schematic cross section of the tools visible in FIG. 4 on which a stiffened panel after a consolidation or polymerization step is positioned; and FIG. 8 is a perspective view of a stiffened panel, illustrating one embodiment of the disclosure herein.

DETAILED DESCRIPTION

According to one embodiment visible in FIG. 8, a stiffened panel 40 comprises a panel 42, in the form of a plate, and reinforcements 44 which are attached to a face of the panel 42 and which are parallel to one another and substantially perpendicular to the panel 42. The reinforcements 44 are oriented in a direction referred to as longitudinal direction. A transverse plane corresponds to a plane perpendicular to the longitudinal direction.

Each reinforcement 44 has a final thickness E44 (dimension measured in a transverse plane in a direction parallel to the panel 42) and a final height H44 (dimension measured in a transverse plane in a direction perpendicular to the panel 42).

In FIG. 8, the panel 42 is flat. Of course, the disclosure herein is not limited to this geometry. Thus, the panel 42 may have at least one radius of curvature in a transverse plane.

According to one application given by way of indication, a central wing box of an aircraft comprises at least one stiffened panel obtained according to the disclosure herein.

Figure 6:
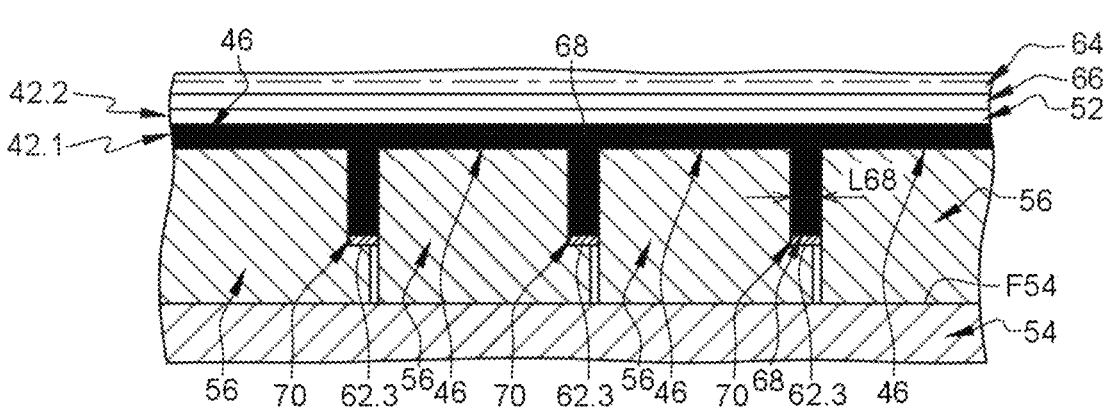
FIG. 6 is a schematic cross section of a device for manufacturing a stiffened panel, illustrating one embodiment of the disclosure herein.

In one embodiment visible in FIG. 6, a stiffened panel 40 is obtained from several preforms of fibers 46 each having a U-shaped or C-shaped cross section, with a base 48 and two wings 50.1, 50.2, the preforms of fibers 46 being placed next to one another such that the bases 48 form at least a first portion 42.1 of the panel 42 and the wings 50.1, 50.2 of two adjacent preforms of fibers 46 are pressed against one another and form a reinforcement 44. In addition, the stiffened panel is obtained from at least one layer of fibers 52, in the form of plies, rovings and/or profiles, which is attached to the bases 48 of the preforms of fibers 46 so as to form a second portion 42.2 of the panel 42.

According to one embodiment, a method for manufacturing a preform of fibers 46 comprises a first step of flat drape forming plies of fibers and then a step of shaping according to a desired cross section for the preform of fibers 46.

The fibers of the preforms of fibers 46 and of the layer of fibers 52 may be dry or pre-impregnated. Then, the preforms of fibers 46 and the layer of fibers 52 are consolidated simultaneously or co-cured, with a supply of resin if the fibers are dry. At the end of this consolidation or polymerization step, a stiffened panel 40 is obtained, the fibers of the bases 48 of the preforms of fibers 46 and of the layer of fibers 52 forming the panel 42 of the stiffened panel 40, the wings 50.1, 50.2 of the preforms of fibers 46 forming the reinforcements 44 of the stiffened panel 40. This operating procedure makes it possible to obtain continuity of the fibers between the reinforcements 44 and the panel 42, this conferring greater mechanical properties on the stiffened panel 40.

According to one embodiment visible in FIG. 6, a device for manufacturing a stiffened panel comprises at least one support 54 having a bearing surface F54, and tools 56 which are attached against the bearing surface F54 of the support 54 and which are each configured to support a preform of fibers 46.

Figure 5:
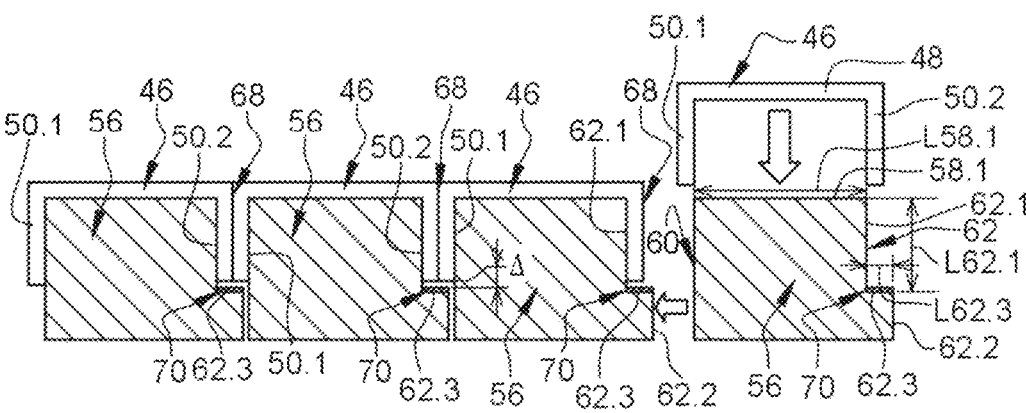
FIG. 5 is a schematic cross section of the tools visible in FIG. 4 on which preforms of fibers are positioned.

According to one configuration visible in FIG. 5, for example, each tool 56 comprises a first face 58.1 configured to receive the base 48 of a preform of fibers 46, a second face 58.2 substantially parallel to the first face 58.1 and first and second lateral faces 60, 62 which connect the first and second faces 58.1, 58.2 and which are configured to receive the wings 50.1, 50.2 of a preform of fibers 46.

According to one embodiment, a manufacturing method referred to as IML (Inner Mold Line) comprises a step of placing each of the preforms of fibers 46 on a tool 56, and a step of positioning the tools 56 against the support 54, juxtaposed with one another, the second face 58.2 of each tool 56 being positioned against the bearing surface F54 of the support 54.

As a result of these steps, the bases 48 of the different preforms of fibers 46 are arranged approximately parallel to the bearing surface F54 of the support 54, are at a distance from the support 54 with respect to the wings 50.1, 50.2 and form the first portion 42.1 of the panel 42.

Then, the manufacturing method comprises a step of laying fibers on the bases 48 of the preforms of fibers 46 so as to form the layer of fibers 52. The fibers deposited during this step may be in the form of plies, rovings and/or profiles.

According to one application, the support 54 comprises four bearing surfaces F54 on which the tools 56 are positioned, each tool being provided with a preform of fibers 46. This assembly forms a mandrel on which rovings of fibers are wound so as to form the layer of fibers 52. The fibers may be laid on the bases 48 of the preforms of fibers 46 using a fiber placement technique referred to as AFP (Automated Fiber Placement).

The manufacturing method also comprises a step of consolidation or polymerization to obtain the stiffened panel 40, and a step of demolding for extracting the stiffened panel 40 from the manufacturing device.

According to one embodiment visible in FIG. 6, the manufacturing device comprises a consolidation or polymerization covering 64 configured to cover the layer of fibers 52 during the consolidation or polymerization step, and possibly at least one caul plate 66 interposed between the layer of fibers 52 and the consolidation or polymerization covering 64.

According to one embodiment, at least one of the lateral faces 60, 62 of the tools 56 comprises a first flat facet 62.1 which is adjacent and substantially perpendicular to the first face 58.1, a second flat facet 62.2 which is adjacent and substantially perpendicular to the second face 58.2 and a set-back portion 62.3 which connects the first and second facets 62.1, 62.2 and which is substantially parallel to the first face 58.1. Each tool has a first width at the first facet 62.1 (dimension measured in a transverse plane and parallel to the first face 58.1) that is smaller than a second width at the second facet 62.2.

According to one embodiment visible in FIGS. 4 to 7, each tool 56 comprises a single set-back portion 62.3 on one of the lateral faces 60, 62.

According to another embodiment that is not shown, each first tool 56 comprises two set-back portions 62.3, one on each of its lateral faces 60, 62.

Thus, when the two tools 56 are juxtaposed, the first facets 62.1 and the set-back portions 62.3 of the two juxtaposed tools 56 or the lateral face 60 of a first tool 56 and the first facet 62.1 and the set-back portion 62.3 of a second tool 56 delimit a recess 68 for the wings 50.1, 50.2 of the two preforms of fibers 46 which are positioned on the two juxtaposed tools 56.

Irrespective of the embodiment, the tools 56 are configured such that, when two tools 56 are juxtaposed, they delimit between them a recess 68 which opens out at the first faces 58.1 and which is configured to accommodate the wings 50.1, 50.2 of the two preforms of fibers 46 which are positioned on the two juxtaposed tools 56.

The tools 56 may have slightly different dimensions as a function notably of the reinforcements 44 to be produced. According to one configuration visible in the figures, they all have a set-back portion 62.3 on the same lateral face.

During the consolidation or polymerization step, the support 54, the tools 56, the preforms of fibers 46 and the layer of fibers 52 are subjected to a variation in temperature. Thus, prior to this consolidation or polymerization step, the support 54, the tools 56, the preforms of fibers 46 and the layer of fibers 52 are at a first temperature corresponding to ambient temperature, of the order of 20° C. During the consolidation or polymerization step, the support 54, the tools 56, the preforms of fibers 46 and the layer of fibers 52 are at a second temperature, significantly greater than the first temperature, of the order of 180° C. This second temperature may vary from one method to the other as a function notably of the nature of the resin.

In spite of this variation in temperature, the preforms of fibers 46 have stable dimensions which more or less do not vary.

At the same time, each tool 56 is sensitive to the variations in temperature and comprises dimensions having first values at the first temperature and second values, greater than the first values, at the second temperature.

When they are positioned on the support 54 at the first temperature, the tools 56 are spaced apart from one another such that they are in contact with one another at the second temperature.

In addition, each tool 56 receiving a preform of fibers 46 has, at the first temperature, a width L58.1, at the first face 58.1, that is smaller than the distance separating the wings 50.1, 50.2 at the base 48 of the preform of fibers 46 at the first temperature. The width L58.1 at the first face 58.1 of the tool 56 at the first temperature is determined in such a way that the wings 50.1, 50.2 are simultaneously in contact with the tool 56 at the second temperature. Thus, each preform of fibers 46 has, at ambient temperature, at least one excess length L with respect to the tool 56 receiving it so that the wings 50.1, 50.2 of the preform of fibers 46 are in contact with the first and second faces 60, 62 of the tool 56 at the consolidation or polymerization temperature.

According to a feature of the disclosure herein, the tools 56 are dimensioned such that, after expansion, each recess 68 has a width L68, at the second temperature, that is substantially equal to the thickness E44 of the reinforcements 44. Thus, at the first temperature, each recess 68 has a width L68 that is greater than the thickness E44 of the reinforcements.

Each tool 56 has a first dimension L62.1, measured in a transverse plane, separating the first face 58.1 and the set-back portion 62.3 and corresponding to the height of the recess 68.

Each first dimension L62.1 has a first value at the first temperature and a second value at the second, consolidation or polymerization temperature. Knowing the first value and the coefficient of expansion of the material of the tool 56, it is possible to determine the second value, and vice versa.

Each tool 56 is dimensioned such that the second value of this first dimension L62.1 is greater than the height H44 of the reinforcement 44 to be produced in the corresponding recess 68. Thus, the ends of the wings 50.1, 50.2 are always at a distance from the set-back portion 62.3, even at the second, consolidation or polymerization temperature.

Each tool 56 has a second dimension L62.3, measured in a transverse plane, separating the first and second facets

62.1, 62.2 and corresponding to the width of the set-back portion 62.3, which has a third value at the first temperature and a fourth value at the second, consolidation or polymerization temperature. Knowing the third value and the coefficient of expansion of the material of the tool 56, it is possible to determine the fourth value, and vice versa.

The third value of the second dimension L62.3 is greater than the final thickness E44 of the reinforcement 44 to be produced in the corresponding recess 68. According to one arrangement, this second dimension L62.3 is determined in such a way that its fourth value at the second, consolidation or polymerization temperature is substantially equal to the final thickness E44 of the reinforcement 44.

Thus, at the second, consolidation or polymerization temperature, the wings 50.1, 50.2 are not compressed between the tools 56, thus limiting the formation of beads.

According to one feature, for only each set-back portion 62.3, the tool 56 has a coating 70 which is able to expand as a function of temperature. This expandable coating 70 is dimensioned so as to completely cover the end edge faces of the two wings 50.1, 50.2. According to another aspect, the expandable coating 70 is configured to no longer expand when it is in contact with the wings 50.1, 50.2 which are positioned in line with the expandable coating 70 during the consolidation or polymerization step.

This expandable coating 70 is non-reversible. Thus, the expandable coating 70 has a thickness which increases as the temperature increases when it is not constrained and which more or less does not vary as the temperature decreases.

Advantageously, this expandable coating 70 comprises a repositionable adhesive layer for connecting it to the tool 56 in order to be able to remain in place when the preforms of fibers 46 and the tools 56 are being manipulated and to detach easily from the set-back portion 62.3 during the consolidation step.

According to one embodiment, this expandable coating 70 is cut into an adhesive strip before being applied against the set-back portion 62.3.

By way of example, the expandable coating 70 is an adhesive tape marketed under the brand "3M" and the reference AF3014-50. Of course, the disclosure herein is not limited to this type of material.

This expandable coating 70 has a first thickness at the first temperature and a second thickness at the second temperature. The second thickness is at least two times greater than the first thickness.

The expandable coating 70 and the first dimension L62.1 of the tool are determined in such a way that, at the second, consolidation or polymerization temperature, the wings 50.1, 50.2 are in contact with the expandable coating 70.

The presence of this expandable coating 70 makes it possible to control the height of the reinforcement 44 positioned in line with the expandable coating 70 while still preventing the formation of beads.

At the end of the consolidation or polymerization step, each expandable coating 70 remains fixed to the end edge faces of the wings 50.1, 50.2. Thus, for each reinforcement 44, the expandable coating 70 forms a structure of protection for the edge face of the reinforcement 44.

According to one operating procedure visible in FIGS. 4 to 7, the manufacturing method comprises:

a step of preparing the tools 56 by attaching an expandable coating 70 at each set-back portion 62.3, as illustrated in FIG. 4, a step of placing the preforms of fibers 46 on the tools 56, as illustrated in FIG. 5, a space A remaining between the wings 50.1, 50.2 and each expandable coating 70, a step of positioning the tools 56 provided with preforms of fibers 46 on the support 54, a step of laying a layer of fibers 52 on the bases 48 of the preforms of fibers 46, a step of placing a consolidation or polymerization covering 64 on the layer of fibers 52, and possibly a caul plate 66 beforehand, a step of consolidation or polymerization, a step of demolding, a step of applying new non-expanded expandable coatings to each of the set-back portions.

During the consolidation or polymerization step visible in FIG. 6, the tools 56 are against one another and the expandable coating 70 is expanded until it comes into contact with the wings 50.1, 50.2.

As illustrated in FIG. 7, after cooling, the tools 56 are spaced apart and have a width L58.1 that is smaller than the distance separating the reinforcements 44. The expandable coatings 70 remain in contact with the reinforcements 44. The stiffened panel 40 can be separated from the tools 56.

This manufacturing device allows the geometry of the stiffened panel to be controlled perfectly by limiting the formation of beads and by calibrating the thickness E44 and the height H44 of the reinforcements 44.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a stiffened panel using a device, the stiffened panel comprising a panel and reinforcements which each have a final thickness and a final height, the device comprising at least one support having a bearing surface, and tools which are configured to each support a preform of fibers having a U-shaped or C-shaped cross section with a base and two wings, each tool having a first face configured to receive the base of the preform of fibers, a second face configured to be positioned against the bearing surface of the at least one support and first and second lateral faces which connect the first and second faces and which are configured to contact the two wings of the preform of fibers, at least one of the first and second lateral faces having a set-back portion which, when two tools are juxtaposed, defines a recess opening out at the first faces and configured to form one of the reinforcements during a consolidation or polymerization step, each tool being subjected, in operation, to a first temperature and then to a second temperature greater than the first temperature during the consolidation or polymerization step, wherein the tools are dimensioned such that each recess has a width at the second temperature that is substantially equal to the final thickness of the reinforcement to be formed in the recess, wherein each tool comprises, only at each set-back portion, a coating configured to expand as a function of temperature, the manufacturing method comprising:

placing the preforms of fibers on the tools which are each provided with the expandable coating only at each set-back portion;

positioning the tools provided with the preforms of fibers on the support;

laying a layer of fibers on the bases of the preforms of fibers;

placing a consolidation or polymerization covering on the layer of fibers;

a step of consolidation or polymerization;

a step of demolding;

and applying new non-expanded expandable coatings to each of the set-back portions.

2. The method for manufacturing a stiffened panel according to claim 1, wherein each tool comprises a first dimension, measured in a transverse plane, separating the first face and the set-back portion, the first dimension having a first value at the first temperature and a second value at the second temperature, and wherein the expandable coating and the first dimension of the tool are determined such that wings of the preforms of fibers that are positioned in line with the set-back portion are in contact with the expandable coating at the second temperature during the consolidation or polymerization step.

3. The method for manufacturing a stiffened panel according to claim 2, wherein the expandable coating is configured to no longer expand when it is in contact with the wings during the consolidation or polymerization step.

4. The method for manufacturing a stiffened panel according to claim 1, wherein the expandable coating is non-reversible.

5. The method for manufacturing a stiffened panel according to claim 4 wherein the expandable coating comprises a repositionable adhesive layer for connecting it to the tool.

6. The method for manufacturing a stiffened panel according to claim 1, wherein each tool comprises, at the set-back portion, a second dimension measured in a transverse plane and corresponding to a width of the set-back portion, the second dimension having a third value at the first temperature and a fourth value at the second temperature, and wherein the third value of the second dimension is greater than the final thickness of the reinforcement to be formed in line with the set-back portion.

7. The method for manufacturing a stiffened panel according to claim 6, wherein the second dimension is determined such that the fourth value is substantially equal to the final thickness of the reinforcement to be formed in line with the set-back portion.

8. A method for manufacturing a stiffened panel having reinforcements which each have a final thickness and a final height, the method comprising:

providing a device comprising at least one support having a bearing surface;

arranging a plurality of tools on the device, each of the plurality of tools having a first face, a second face opposing the first face and positioned against the bearing surface of the support, and first and second lateral faces which connect the first and second faces, at least one of the first and second lateral faces having a set-back portion which, when two of the plurality of tools are juxtaposed, defines a recess opening out at the first faces;

applying a coating configured to expand as a function of temperature only at the set-back portion of each of the plurality of tools;

positioning a preform of fibers having a U-shaped or C-shaped cross section on each of the plurality of tools, each preform of fibers having a base positioned on the first face of one of the plurality of tools and two wings positioned against the first and second lateral faces, respectively, of the one of the plurality of tools, wherein the wings of adjacent preforms are in the recess opening formed between the two of the plurality of tools to form one of the reinforcements;

positioning a layer of fibers on the bases of the preforms of fibers;

positioning a consolidation or polymerization covering on the layer of fibers;

subjecting each of the plurality of tools to a first temperature and then to a second temperature greater than the first temperature, wherein the second temperature corresponds to a temperature at which the preforms of fibers and the layer of fibers consolidate or polymerize to form the stiffened panel, and wherein the plurality of tools are dimensioned such that each recess opening has a width at the second temperature that is substantially equal to the final thickness of the reinforcement to be formed in the recess opening, demolding the stiffened panel from the device;

and applying new non-expanded expandable coatings only at the set-back portion of each of the plurality of tools.

9. The method for manufacturing a stiffened panel according to claim 8, wherein each tool comprises a first dimension, measured in a transverse plane, separating the first face and the set-back portion, the first dimension having a first value at the first temperature and a second value at the second temperature, and wherein the expandable coating and the first dimension of the tool are determined such that wings of the preforms of fibers that are positioned in line with the set-back portion are in contact with the expandable coating at the second temperature during the consolidation or polymerization step.

10. The method for manufacturing a stiffened panel according to claim 9, wherein the expandable coating is configured to no longer expand when it is in contact with the wings during the consolidation or polymerization step.

11. The method for manufacturing a stiffened panel according to claim 8, wherein the expandable coating is non-reversible.

12. The method for manufacturing a stiffened panel according to claim 11, wherein the expandable coating comprises a repositionable adhesive layer for connecting it to the tool.

13. The method for manufacturing a stiffened panel according to claim 8, wherein each tool comprises, at the set-back portion, a second dimension measured in a transverse plane and corresponding to a width of the set-back portion, the second dimension having a third value at the first temperature and a fourth value at the second temperature, and wherein the third value of the second dimension is greater than the final thickness of the reinforcement to be formed in line with the set-back portion.

14. The method for manufacturing a stiffened panel according to claim 13, wherein the second dimension is determined such that the fourth value is substantially equal to the final thickness of the reinforcement to be formed in line with the set-back portion.

* * * * *